United States Patent
Asheim et al.

(10) Patent No.: US 11,384,732 B2
(45) Date of Patent: Jul. 12, 2022

(54) NOISE REDUCTION MEANS FOR A WIND TURBINE BLADE, WIND TURBINE BLADE, WIND TURBINE, AND METHOD FOR NOISE REDUCTION FOR A WIND TURBINE BLADE

(71) Applicant: Siemens Gamesa Renewable Energy A/S, Brande (DK)

(72) Inventors: Michael J. Asheim, Vejle (DK); Steven Buck, Boulder, CO (US)

(73) Assignee: SIEMENS GAMESA RENEWABLE ENERGY A/S

( * ) Notice: Subject to any disclaimer, the term of this patent is extended or adjusted under 35 U.S.C. 154(b) by 0 days.

(21) Appl. No.: 16/927,232

(22) Filed: Jul. 13, 2020

(65) Prior Publication Data
US 2022/0010774 A1    Jan. 13, 2022

(51) Int. Cl.
*F03D 7/02* (2006.01)
*F03D 1/06* (2006.01)

(52) U.S. Cl.
CPC .......... *F03D 7/0296* (2013.01); *F03D 1/0633* (2013.01)

(58) Field of Classification Search
CPC ...... F03D 7/0296; F03D 80/00; F03D 1/0633; F03D 1/0641; F03D 1/0675; F03D 1/0683
See application file for complete search history.

(56) References Cited

U.S. PATENT DOCUMENTS

2007/0031237 A1 * 2/2007 Bonnet ................ F03D 7/048
415/1
2017/0342960 A1 * 11/2017 Enevoldsen ............ F03D 17/00
2020/0088162 A1    3/2020 Buck

FOREIGN PATENT DOCUMENTS

| EP | 3249216 A1 | 11/2017 | |
|---|---|---|---|
| EP | 3587799 A1 | 1/2020 | |
| WO | 2013045601 A1 | 4/2013 | |
| WO | WO-2016066170 A1 * | 5/2016 | ............. F03D 17/00 |
| WO | WO-2017180192 A1 * | 10/2017 | ........... F03D 1/0633 |

OTHER PUBLICATIONS

PCT International Search Report and Written Opinion of International Searching Authority dated Sep. 30, 2021 corresponding to PCT International Application No. PCT/EP2021/068321 filed Jul. 2, 2021.

* cited by examiner

Primary Examiner — Justin D Seabe
(74) Attorney, Agent, or Firm — Schmeiser, Olsen & Watts LLP

(57) ABSTRACT

Provided is a noise reduction means for a wind turbine blade comprising an active noise reduction device and a passive noise reduction device, wherein the passive noise reduction device comprises at least one serrated edge profile adapted for fixation to a trailing edge of the wind turbine blade, wherein the active noise reduction device comprises at least one unsteady pressure sensor adapted to produce an output signal corresponding to a turbulent flow condition during operation of the wind turbine blade, at least one actuator and a control unit, wherein the sensor is arranged adjacent to a serrated edge of the serrated edge profile and the control unit is adapted to control the actuator in dependence of the output signal of the sensor to emit an anti-noise signal at least partly reducing the noise generated by the wind turbine blade.

14 Claims, 2 Drawing Sheets

Figure 1:
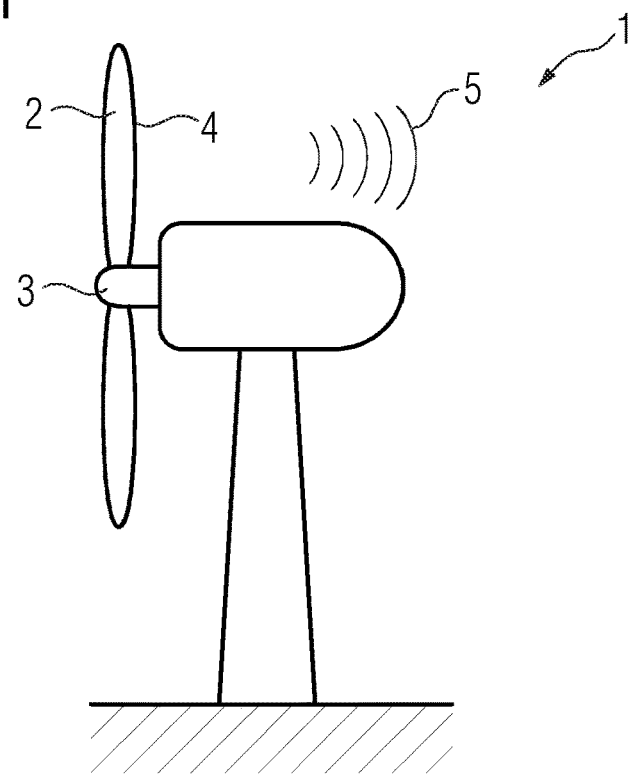

NOISE REDUCTION MEANS FOR A WIND TURBINE BLADE, WIND TURBINE BLADE, WIND TURBINE, AND METHOD FOR NOISE REDUCTION FOR A WIND TURBINE BLADE

FIELD OF TECHNOLOGY

The invention relates to a noise reduction means for a wind turbine blade comprising an active noise reduction device and a passive noise reduction device, wherein the passive noise reduction device comprises at least one serrated edge profile adapted for fixation to a trailing edge of the wind turbine blade. Furthermore, the invention relates to a wind turbine blade, a wind turbine and a method for noise reduction for a wind turbine blade.

BACKGROUND

Trailing edge noise emitted from a wind turbine blade during operation of the wind turbine is the dominant noise generation mechanism for modern industrial scale wind turbines. The noise generated from the wind turbine during operation determines the region where the wind turbines can be erected, or correspondingly the manner in which the machine can be operated in order to comply with noise limitations in the surroundings of the wind turbine.

The emittance of excessive noise during operation of the wind turbine may cause a necessity to operate the wind turbine in a curtailed operation mode, wherein power generation is sacrificed in order to limit the noise emission. Thus, the noise emission of a wind turbine may directly affect its economic viability. Therefore, there is a demand for noise reduction technologies, in particular for on-shore wind turbines. A method for limiting the noise emitted by a wind turbine blade is the usage of serrations at the trailing edges of wind turbine blades to passively reduce the noise emitted at the trailing edge. In the state of the art, further approaches have been considered to reduce the noise of wind turbines, in particular of the wind turbine blades of a wind turbine.

In EP 3 249 216 A1, a rotor blade with noise reduction means is described. The rotor blade comprises at least one sensor for detecting flow characteristics of a fluid flowing substantially from the leading edge to the trailing edge of the rotor blade. The rotor blade further comprises at least one actuator for producing an anti-noise signal for at least partly cancelling out the flow-induced edge noise of the rotor blade.

WO 2008/043874 A1 discloses a system for suppressing and eliminating noise in wind turbines, wherein the system comprises a plurality of microphones disposed over the tower and the span of the blades. The microphones on the blade measure the near-field turbulent pressure fluctuations, and the microphones on the tower measure the acoustic far-field noise generated by the turbulence passing the blade trailing edge. Based on the signals captured by the microphones, loudspeakers located at the blades are actuated to cancel the noise generated by the rotor US 2013/0164135 A1 discloses a system and a method for actively suppressing a noise signature from a noise emitting component of a wind turbine. Therefore, an active noise measuring device capable of measuring an original noise signature of the noise emitting wind turbine component is used. Based on the measured noise signature, an inverted noise signature is created and an amplifier is used to amplify the inverted noise signature for emitting it using at least one speaker.

SUMMARY

It is an object of the invention to provide an improved noise reduction means for a wind turbine blade.

According to the invention, this object is solved by a noise reduction means as initially described, wherein the active noise reduction device comprises at least one unsteady pressure sensor adapted to produce an output signal corresponding to a turbulent flow condition during operation of the wind turbine blade, at least one actuator and a control unit, wherein the sensor is arranged adjacent to a serrated edge of the serrated edge profile and the control unit is adapted to control the actuator in dependence of the output signal of the sensor to emit an anti-noise signal at least partly reducing a noise generated by the wind turbine blade.

The noise reduction means according to the invention combines a serrated trailing edge profile as a passive noise reduction device and an active noise reduction device comprising at least unsteady pressure sensor, or at least one acoustic sensor, respectively, a control unit and at least one actuator. By arranging the at least one sensor adjacent to the serrated edge of the serrated edge profile, an active noise reduction corresponding to the noise generation by the turbulent flow condition at the serrated edge is enabled. In addition, the noise reducing effect of both the active noise reduction device and the passive noise reduction device are combined, so that an improved noise reduction by the noise reduction means may be obtained. The noise reduction means may be regarded as a combined noise reduction system.

Theoretical and experimental results have shown that an active noise reduction device may achieve reductions of roughly 6 dB at frequencies where it is most effective, or as a maximal attenuation, respectively. In order to further increase the reduction of the noise generated by the wind turbine, a combination of the active noise reduction device and a serrated edge profile as a passive noise reduction device can be used advantageously, since for serrated trailing edges noise reductions of up to 10 dB at their most effective frequencies may be obtained. The arrangement of the at least one sensor and the serrated edge of the serrated edge profile allows for a specific adaption of the anti-noise signal to the serrated edge profile and therefore to the creation of synergetic effects that increase the overall noise reduction capability of the noise reduction means.

Compared to a usage of only an active noise reduction device, the number of sensors required for obtaining a certain attenuation of the noise at a given location in a far field may be reduced when the active noise reduction device is used in combination with a serrated edge profile as a passive noise reduction device. Since the performance of an active noise reduction devices depends on both the number of the sensors and their spacing, also the spacing between the sensors may be larger in combination with a serrated edge facilitating a fabrication of the noise reduction means and reducing its costs.

The noise reduction means may be attached to a wind turbine to reduce the noise created by the wind turbine blade during operation, hence in a mounted state of the wind turbine blade when wind flows over the profile of the wind turbine blade, in particular when the rotor is rotating. The anti-noise signal is created and emitted in particular in such a manner that the noise in the far field is reduced, hence in at least one position or area in the surroundings of the wind turbine which is affected by the noise of the wind turbine, for instance in a downwind direction, where the noise propagates most efficiently. The far field refers to the region outside of the turbulent airflow surrounding the airfoil/blade, where pressure variation specifically comprises acoustic waves that propagate efficiently and that are acoustically perceptible as noise. By reducing the far field noise of the wind turbine, the effects of the noise on a surrounding of the wind turbine may be minimized.

The noise reduction means may be included in a wind turbine blade during its fabrication or it may be provided as an add-on package which may be amended to existing wind turbines, or their wind turbines blades, respectively, for reducing the noise created during their operation. Therefore, the serrated edge profile comprising the at least one sensor of the active noise reduction device, the control unit and the at least one actuator may be mounted to the wind turbine blade, wherein the at least one sensor and the at least one actuator are connected to the control unit of the active noise reduction device.

In a preferred embodiment of the invention, the active noise reduction device comprises a plurality of sensors, wherein the sensors are arranged alongside the serrated edge, in particular in one or more rows with each a constant or essentially constant distance between the serrated edge and each of the sensors of the row and/or in one or more rows with each a varying distance between the serrated edge and each of the sensors of the row. The plurality of sensors is in particular arranged in one or more rows alongside a spanwise direction of the serrated trailing edge profile, wherein the sensors follow the course of the serrated edge in each of the rows in particular within a constant or essentially constant distance between each of the sensors and the serrated edge of the serrated edge profile. Additionally or alternatively, it is also possible that the sensors are arranged in one or more rows, wherein a distance between the each of the sensors of the row and the serrated edge is varying, for instance depending on a spanwise position of the sensor, so that the sensors are closer to the serrated edge when the fluid flow at the position of the sensor is lower. The sensors following the serrated edge may be considered to be arranged along a non-linear path at the trailing edge of the wind turbine, wherein the path may be taken as a reference for the determination of the generated noise, or the anti-noise signal, respectively. By the plurality of unsteady pressure sensors, an unsteady flow situation at the serrated edge, in particular a pressure of a fluid flowing along the wind turbine blade, can be recorded with a spatial resolution defined by the positions of the sensors along the path.

According to the invention, the spacing between two neighbouring sensors alongside the serrated edge is uniform or non-uniform. In a uniform spacing, the distance between two neighbouring sensors may be equal or essentially for all pairs of neighbouring sensors. The uniform spacing of the plurality of the sensors enables a uniform measuring of the acoustic characteristics along the reference path following the serrated edge. In a non-uniform sensor spacing, pairs of neighbouring sensors of the plurality of sensors may comprise different distances between the sensors along the path running adjacent to the serrated edge and following the shape of the serrated edge. The non-uniform sensors spacing may facilitate a spatial filtering of the turbulent flow along the surface of the blade.

In a preferred embodiment of the invention, the serrated edge profile comprises a plurality of teeth, in particular of triangular teeth, forming the serrated edge. The triangular teeth of the serrated edge profile may be located directly adjacent to each other, so that a saw-tooth profile of the serrated edge is obtained. It is also possible that two adjacent teeth of the serrated edge profile are arranged spaced apart so that in between two neighbouring teeth a straight trailing edge segment is obtained. Additionally or alternatively to the triangular teeth, also other shapes of the teeth are possible.

Preferably, the serrated edge profile comprises at least one flow-traversable structure, in particular a comb structure and/or a porous structure, arranged in between two neighbouring teeth. The teeth are solid structures, which are not traversable by a fluid flow. By providing a flow-traversable structure like a comb structure or a porous structure in between two neighbouring teeth, the noise reduction of the serrated edge profile can be increased, hence a higher level of noise attenuation may be obtained by using a serrated edge profile with comb structures.

In a preferred embodiment of the invention, the at least one actuator is arranged on a substrate attachable to the wind turbine blade and/or on an arrangement portion of the serrated edge profile. The control unit may be arranged for instance on or in the substrate, in a hollow cavity of the wind turbine blade and/or the serrated edge profile as well. The actuators or a part of the actuators, respectively, may be arranged on an arrangement portion of the serrated edge profile. Additionally or alternatively, the actuators or a part of the actuators may be arranged on a separate substrate, which is attachable to the wind turbine blade.

It is possible that the sensors at the serrated edge profile, the control unit and the actuators are connected using connection means, like electrical cables, a wireless connection or the like, after installation of the noise reduction means as add-on to a wind turbine blade, or during the fabrication process of the wind turbine blade, respectively.

Preferably, the actuator comprises a loudspeaker and/or the sensor comprises a pressure transducer, in particular an unsteady surface pressure transducer, an optical unsteady pressure transducer and/or a microphone. By the sensor, a local pressure, in particular a local pressure of a fluid like air, or wind, respectively, flowing along the wind turbine blade, is measured, so that information about the turbulent pressure field at the trailing edge may be gathered. These pressures may be used for determination of a noise generation at the trailing edge in the control unit by providing output signals of the sensors corresponding to the measured pressures. Then, an anti-noise signal corresponding to the noise generation may be determined by the control unit for at least partly reducing the noise generated by the wind turbine blade. The anti-noise signal may be emitted using a loudspeaker as actuator for generation of the entire noise signal. It is possible that one or more actuators and/or the control unit comprise an amplifier for emittance of the anti-noise signal with a sufficient signal level.

Preferably, the control unit is adapted to use a transfer function describing a relation between the output signal of the sensor at the serrated edge, in particular a filtered combination of the output signals of a plurality of sensors, and a far field noise for determination of the anti-noise signal. Since the noise reduction should apply preferably to a far field in the surroundings of the wind turbine, a transfer function describing the relation between the output signals of the sensor, hence in particular the surface pressures measured by the unsteady pressure sensors, at the serrated edge may be used to determine a noise generation at the serrated edge, in particular to determine a three-dimensional acoustic field created at the serrated edge. Based on the acoustic field, the anti-noise signal, which is emitted by the at least one actuator, can be determined in order to provide the desired noise reduction of the far field noise in a feed-forward process. It is possible that a sum of the output signals or a filtered combination of the output signals of the sensors in the vicinity of the actuator is used to determine the anti-noise signal to be emitted by the actuator.

Preferably, the transfer function is adapted to the serrated edge profile, in particular to a noise generation characteristic of the serrated edge profile. The noise generation at the serrated edge of the serrated edge profile depends on the shape of the serrated edge and may differ significantly from the noise generation at a straight trailing edge, so that the noise radiation characteristics of a trailing edge comprising a serrated edge profile is considerably different from the noise radiation characteristics of a straight trailing edge. By adaption of the control unit to the noise generation characteristic of the serrated edge profile, an improved noise reduction may be obtained using the noise reduction means.

Preferably, the transfer function is empirically determined by at least one measurement and/or the transfer function is stored in a data storage unit of the active noise reduction device. The data storage unit may be for instance a part of the control unit, or it may be connected to the control unit, respectively. Since the noise generation created by a fluid flowing over a serrated edge may be difficult to be described analytically, a measurement may be used advantageously for empirically determining the transfer function used for determination of the required anti-noise signal.

The transfer function may be determined for instance using measurements in an acoustic wind tunnel. Advantageously, a modelling of the wind turbine blade as well as of the physical relations at the serrated edge, the so-called plant modelling, in the controller may be avoided since a determination of the noise generated by the serrated edge is possible using the empirically determined transfer function. Advantageously, a modelling of the acoustic scattering effect at the serrated trailing edge, which is difficult to describe analytically and which may rely at least partly on not fully established physical models, can be avoided or at least partially avoided. The transfer function is dependent on physical parameters such as flow speed and local angle of attack, so the transfer function may be determined empirically at specific operating points and generalized using analytical models.

A wind turbine blade according to the invention comprises at least one noise reduction means according to the invention.

A wind turbine according to the invention comprises at least one wind turbine blade according to the invention.

All details and advantages of the noise reduction means according to the invention apply correspondingly to the wind turbine blade and the wind turbine according to the invention.

A method for noise reduction for a wind turbine blade according to the invention uses an active noise reduction device and a passive noise reduction device, wherein the passive noise reduction device comprises at least one serrated edge profile adapted for fixation to a trailing edge of the wind turbine blade, wherein the active noise reduction device comprises at last one unsteady pressure sensor adapted to produce an output signal corresponding to a turbulent flow condition during operation of the wind turbine blade, at least one actuator and a control unit, wherein the sensor is arranged adjacent to a serrated edge of the serrated edge profile and the control unit controls the actuator in dependence of the output signal of the sensor to emit an anti-noise signal at least partly reducing a noise generated by the wind turbine blade.

In a preferred embodiment of the invention, the control unit uses a transfer function describing a relation between the output signal of the sensor at the serrated edge, in particular a filtered combination of the output signals of a plurality of sensors, and a far field noise for determination of the anti-noise signal.

Preferably, a transfer function adapted to the serrated edge profile, in particular to a noise generation characteristic of the serrated edge profile, and/or a transfer function determined by at least one measurement and/or stored in a data storage unit of the active noise reduction device is used.

All details and advantages described previously with regard to the noise reduction means according to the invention apply correspondingly to the method for noise reduction for a wind turbine blade according to the invention.

BRIEF DESCRIPTION

Figure 2:
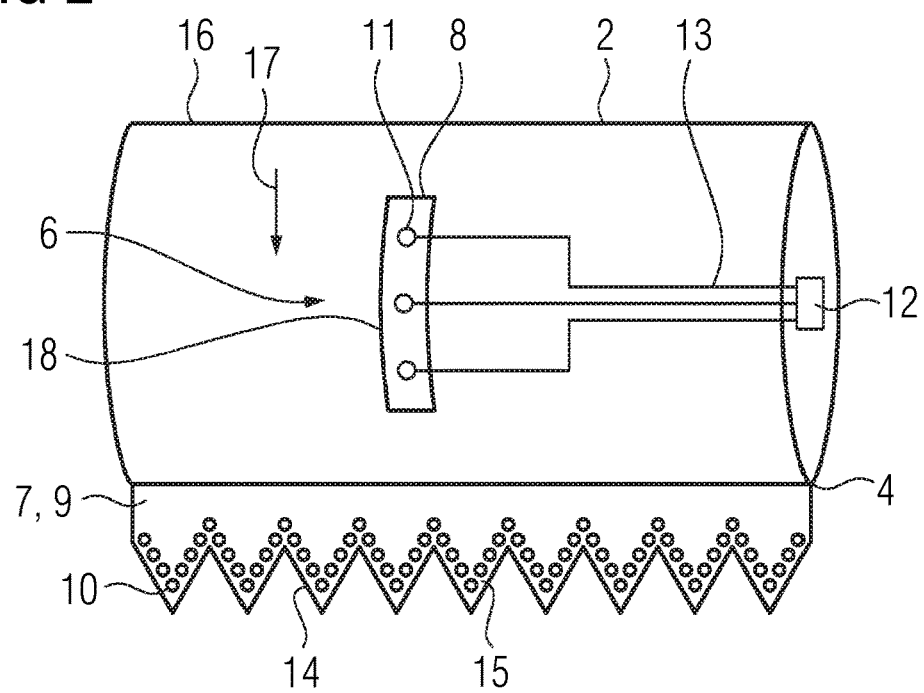
Figure 3:
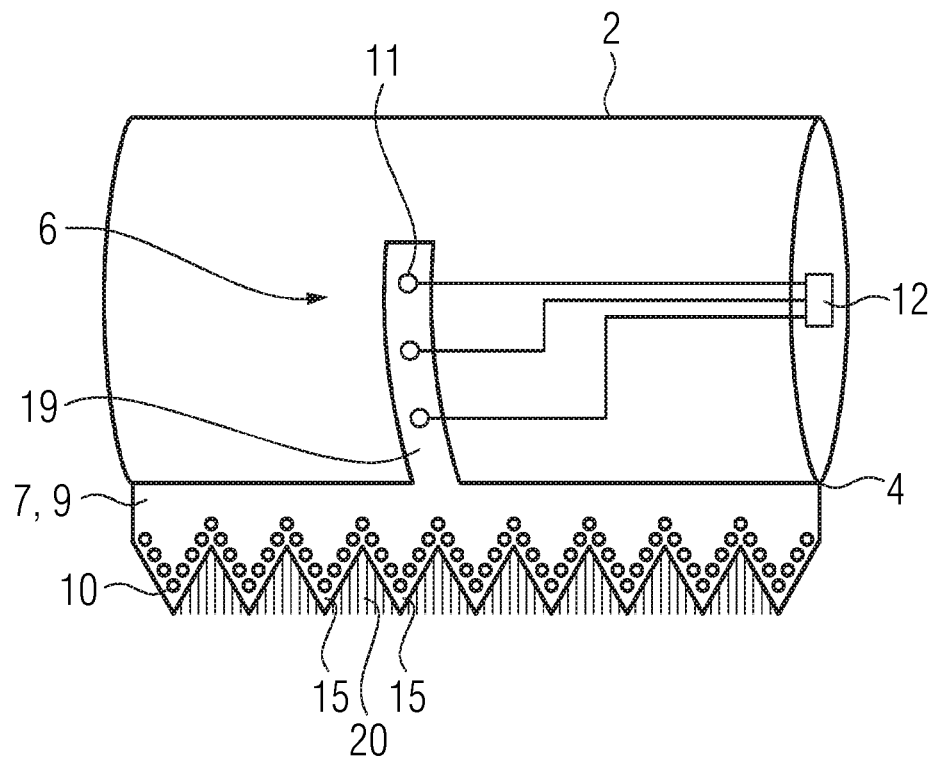
Figure 4:
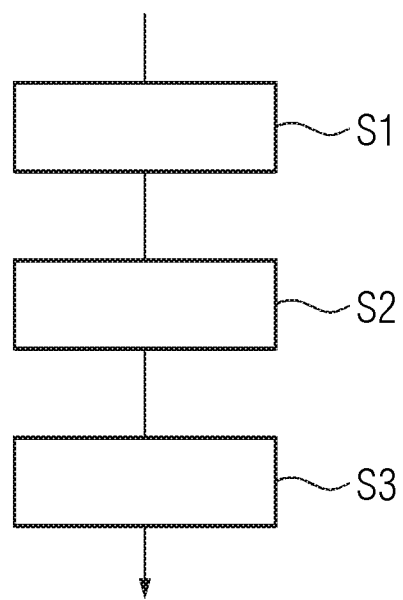

Other objects and features of the present invention will become apparent from the following detailed description considered in conjunction with the accompanying drawings. The drawings, however, are only principle sketches designed solely for the purpose of illustration and do not limit the invention. The drawings show:

FIG. 1 an embodiment of the wind turbine according to the invention comprising a plurality of wind turbine blades according to the invention, FIG. 2 a first embodiment of a noise reduction means according to the invention, FIG. 3 a second embodiment of a noise reduction means according to the invention, and FIG. 4 a flow diagram of a method for noise reduction for a wind turbine blade according to the invention.

DETAILED DESCRIPTION

In FIG. 1, a wind turbine 1 is shown. The wind turbine 1 comprises a plurality of wind turbine blades 2, which are mounted to a hub 3 of the wind turbine 1. During operation of the wind turbine 1, wind is flowing along a profile of each of the wind turbine blades 2, wherein noise is generated in particular at a trailing edge 4 of the wind turbine blade 2. This may occur in particular, when the rotor comprising the wind turbine blades 2 and the hub 3 of the wind turbine 1 is rotating, in particular for power generation using a generator of the wind turbine 1.

The emitted noise is schematically depicted by the lines 5 and affects in particular the surroundings of the wind turbine 1. In order to reduce the noise at least partly, in particular to reduce a far field noise affecting at least one position and/or area in a distance from the wind turbine 1, a noise reduction means 6 comprising both a passive noise reduction device 7 and an active noise reduction device 8 are used for one or more of the wind turbine blades 2, in particular for each of the wind turbine blades 2, as described in the following.

In FIG. 2, a segment of a wind turbine blade 2 with a first embodiment of a noise reduction means 6 is shown. The noise reduction means 6 comprises a passive noise reduction device 7 and an active noise reduction device 8. The passive noise reduction device 7 comprises a serrated edge profile 9. The passive noise reduction device 7 is adapted for fixation to the trailing edge 4 of the wind turbine blade 2, so that after fixation, the trailing edge 4 of the wind turbine blade is formed by the serrated edge profile 9. The passive noise reduction device 7 may comprise a plurality of serrated edge profiles 9, which may be in particular arranged along the entire trailing edge 4 of the wind turbine blade 2, hence from a root end at the hub 3 of the wind turbine blade 1 to a tip of the wind turbine blade 2. The segment of the wind turbine blade 2 is shown only schematically, it is possible that the shape of the segment of the wind turbine blade 2 is different, in particular it is possible that the segment to which the noise reduction means 6 is mounted is a tip segment of the blade comprising a curved trailing edge 4. The noise reduction means 6 may be mounted in particular to the outboard 10% of the blade, where a flow speed of the wind over the blade and hence a noise generation is the highest during operation of the wind turbine blade 2. However, to reduce also noise created at inboard sections of the wind turbine blade 2, also an extension of the noise reduction means 6 to inboard segments of the wind turbine blade 2 and/or a usage of multiple noise reduction means 6 arranged on the trailing edge 4 is possible.

The active noise reduction device 8 comprises a plurality of unsteady sensors 10, or acoustic sensors, respectively, which are adapted to produce an output signal corresponding to a turbulent flow condition during operation of the wind turbine blade 2. The turbulent flow measured by the sensors 10 causes the generation of noise during operation of the wind turbine blade 2. Furthermore, the active noise reduction device 8 comprises a plurality of actuators 11 and a control unit 12. The control unit 12 is connected to each of the actuators 11 as depicted by the connections 13, which may be for instance electrical connections. The control unit 12 is also connected to each of the sensors 10, wherein the connections to the sensors 10 are not shown for the sake of clarity. Besides using one or more electrical cables for connecting the sensors 10 and/or the actuators 11 to the control unit 12, also a wireless connection is possible.

The sensors 10 are arranged adjacent to a serrated edge 14 of the serrated edge profile 9. The sensors 10 are arranged alongside serrated edge 14 with a constant or essentially constant distance between the serrated edge 14 and each of the sensors 10.

By each of the sensors 10, a local pressure of a fluid like air or wind, respectively, at the position of the sensor 10 is measured. The sensors 10 each comprise a pressure transducer like a surface pressure transducer, an optical unsteady pressure sensor and/or a microphone for measuring a pressure at the serrated edge 14 of the serrated edge profile 9. Furthermore, the sensors 10 are adapted to produce an output signal corresponding to the measured pressure. The fluid pressure measured by the sensors 10 is related to a noise generation at the serrated edge profile 9 during an operation of the wind turbine blade 2.

The output signal of each of the sensors 10 is transmitted to the control unit 12, wherein the control unit 12 is adapted to determine a noise generated from the wind turbine blade 2, in particular a far field noise or a three-dimensional noise field, respectively. Additionally, the control unit 12 is adapted to determine an anti-noise signal at least partly reducing the generated noise and to control the actuators 11 to produce the anti-noise signal. The actuators 11 may be for instance speakers, which are used to emit the anti-noise signal. The control unit 12 and/or the actuators 11 may comprise an amplifier for producing an anti-noise signal with a sufficient sound level. The anti-noise signal is interfering with the noise generated by the wind turbine 2, in particular by the trailing edge 4 of the wind turbine blade 2 or the serrated edge profile 9, respectively, in order to reduce the noise at least partly in a far field in the surroundings of the wind turbine 1.

For determination of the anti-noise signal, the control unit 12 uses a transfer function describing a relation between the output signals, or the measured pressures, respectively, of the sensors 10 at the serrated edge 9 and a far field noise. In particular, a filtered combination of the output signals of a plurality of sensors 10, in particular of sensors 10 in the vicinity of the actuators 11, may be used. Furthermore, the anti-noise signal may depend on the positioning of the sensors 10 and the actuators 11 on the wind turbine 2. The transfer function used by the control unit 12 is adapted to the serrated edge profile 9, so that a noise generation of the serrated edge profile 9 may be considered. This noise generation may depend for instance on the shape of the serrated edge profile 9, in particular on the shape of the serrated edge 14 of the serrated edge profile 9.

In this embodiment, the serrated edge profile 9 comprises a plurality of teeth 15, which are arranged directly adjacent to each other forming the serrated edge 14. Besides the active noise reduction by the active noise reduction device 8, also the serrated edge profile 9 creates a noise reduction during operation of the wind turbine blade 2. The noise may be in particular be generated by a fluid flowing along a profile of the wind turbine blade 2, in particular by wind flowing from a leading edge 16 of the wind turbine blade 2 to the trailing edge 4 as indicated by the arrow 17.

The actuators 11 are arranged on a substrate 18, which is attached to the surface of the wind turbine blade 2. Also the serrated edge profile 9 is adapted to be fixated to a trailing edge 4 of the wind turbine blade 2, so that an existing wind turbine blade 2 can be amended using the noise generation means 6 by attaching the substrate 18 and the serrated edge profile 9 to the wind turbine blade 2. For fixation, the serrated edge profile 9 may comprise for instance a fixation segment adapted to a shape of a trailing edge portion of the wind turbine blade 2. Alternatively, it is possible that the serrated edge profile 9 is fixated to the trailing edge 4 during a fabrication process, in particular a casting process, of the wind turbine blade 2.

The control unit 12 may be arranged for instance inside an interior of the wind turbine blade 2. Alternatively, the control unit 12 may be integrated into the serrated edge profile 9 and/or in the substrate 18 that carries the actuators 11.

The sensors 10 may be arranged with a uniform distance or a non-uniform distance between each pair of neighbouring sensors 10 along the serrated edge 14 of the serrated edge profile 9. The uniform or non-uniform arrangement of sensors 10 may affect a filtering or the output signals generated by the plurality of sensors 10 in the control unit 12 and may be chosen depending on a shape of the serrated edge profile 9.

The transfer function used in the control unit 12 may be stored in a data storage unit of the active noise reduction device 8, in particular in a data storage unit of the control unit 12. The transfer function may be determined empirically by at least one measurement, for instance by a measurement performed in an acoustic wind tunnel using the serrated edge profile 9 and/or a part of the wind turbine blade 2.

In FIG. 3, a second embodiment of a noise reduction means 6 is shown. In this embodiment, the actuators 8 are arranged on an arrangement portion 19 of the serrated edge profile 9. This allows for providing the noise reduction means 6 as a one-piece part facilitating an amendment of the noise reduction means 6 to existing wind turbine blades 2. In this embodiment, the serrated edge 14 comprises comb structures as flow-traversable structures 20 arranged in between two neighbouring teeth 15 of the serrated edge profile 9. It is also possible that instead of at least a part of the comb structures, porous structures are arranged in between some or all pairs of neighbouring teeth 15 as used as flow-traversable structures. By using the flow-traversable structures 20 in between the teeth 15 of the serrated edge profile 9, which are solid structures and therefore not traversable by a fluid flow, a noise reduction achieved by the serrated edge profile 9 can be further improved. The control unit 12 of the noise reduction device 6 may use a transfer function adapted to the serrated edge profile 9 taking into account the noise generation characteristics of the serrated edge profile 9 used as passive noise reduction device 7 of the noise reduction means 6.

In both the first embodiment depicted in FIG. 2 and the second embodiment depicted in FIG. 3 of the noise reduction means 6, the serrated edge 9 may have a different geometry. It is possible that the teeth have a shape different from the depicted triangular shape and/or that the teeth are not arranged directly adjacent to each other, so that for instance a straight trailing edge segment is provided in between two neighbouring teeth 15. It is also possible that in each of the embodiments the sensors 10 are arranged in one or more rows along the serrated edge 14, wherein a distance between the sensors 10 and the serrated edge 14 for each row is constant or essentially constant. The sensors 10, or a part of the sensors 10, may also be arranged in one or more rows with each a varying distance between the sensors 10 of the row and the serrated edge 14. The distance between a sensor 10 may depend for instance on a spanwise position of the sensor 10, so that the sensors 10 are closer to the serrated edge 14 when the fluid flow at the position of the sensor 10 is lower.

Different noise generation characteristics describing the noise generated at the serrated edge profile 9 depend on the shape of the serrated edge 14, or its teeth 15, respectively. The noise generation characteristic used in combination with the active noise reduction device 8 may be taken into account by providing a transfer function corresponding to the used serrated edge profile 9 in the control unit 12 for determination of the anti-noise signal created by the actuators 11.

In all embodiments, the noise reduction means 6 may be formed as a part of the wind turbine blade 2, in particular as an integral part of the wind turbine blade 2 included during a casting process of the wind turbine blade 2, or the noise generation means 6 may be amended to an existing wind turbine blade 2 as an add-on comparable to passive serrations or vortex generators. The fixation may occur for instance by adhering the noise generation means 6, for instance by gluing or other fixation means, to a surface of the wind turbine blade 2 as an upgrade and/or a retrofit procedure.

In FIG. 4, a flow diagram of a method for noise reduction for a wind turbine blade is shown. The method may be conducted using a noise reduction means 6 as previously described.

In a first step S1, the plurality of sensors 10 arranged adjacent to the serrated edge 14 of the serrated edge profile 9 are used to create an output signal that corresponds to a turbulent flow condition at the serrated edge profile 9 mounted to the trailing edge 4 of the wind turbine blade 2. Therefore, the sensors 10 may measure for instance a surface pressure of a fluid at the position of each of the sensors 10 and provide an output signal corresponding to the measured pressure. The output signals of all sensors 10 are transmitted to the control unit 12.

In step S2, the control unit 12 receives the output signals of the sensors 10 and uses the output signals together with a transfer function describing the noise generation at the serrated edge 9 to determine for instance a three-dimensional acoustic field created at the serrated edge profile 9 at the current state of operation of the wind turbine blade 2 described by the output signals of the sensors 10. Based on these acoustic fields determined by the control unit 12, an anti-noise signal that may at least partly reduce the noise generated by the wind turbine blade 2 through interference with the acoustic field is determined by the control unit 12.

In step S3, the control unit 12 controls the actuators 11 to emit the anti-noise signal for partly reducing the noise generated by the wind turbine blade 2. This method can be performed in particular as a feed-forward process by repeating the steps S1 to S3 for instance in regular time intervals to create an anti-noise signal corresponding to the current noise generation situation at the serrated trailing edge 9 described by the output signals of the sensors 10.

Although the present invention has been described in detail with reference to the preferred embodiment, the present invention is not limited by the disclosed examples from which the skilled person is able to derive other variations without departing from the scope of the invention.

The invention claimed is:

1. A noise reduction means for a wind turbine blade comprising:
    an active noise reduction device and a passive noise reduction device, wherein the passive noise reduction device comprises at least one serrated edge profile adapted for fixation to a trailing edge of the wind turbine blade, the at least one serrated edge profile having a plurality of teeth forming a serrated edge, wherein the active noise reduction device comprises a plurality of unsteady pressure sensors adapted to produce an output signal corresponding to a turbulent flow condition during operation of the wind turbine blade, at least one actuator and a control unit, wherein the plurality of unsteady pressure sensors are arranged adjacent to the serrated edge of the serrated edge profile and the control unit is adapted to control the actuator in dependence of the output signal of the plurality of unsteady pressure sensors to emit an anti-noise signal at least partly reducing a noise generated by the wind turbine blade, and
    wherein the plurality of unsteady pressure sensors includes at least three sensors, wherein the at least three sensors are arranged in one or more rows along the serrated edge, wherein each respective row of the one or more rows is positioned at a respective constant distance from the serrated edge.

2. The noise reduction means according to claim 1, wherein the serrated profile comprises at least one flow-traversable structure arranged in between two neighbouring teeth.

3. The noise reduction means according claim 1, wherein the at least one actuator is arranged on a substrate attachable to the wind turbine blade and/or on an arrangement portion of the serrated edge profile.

4. The noise reduction means according to claim 1, wherein the actuator comprises a loudspeaker and/or that at least one unsteady pressure sensor comprises a pressure transducer.

5. The noise reduction means according to claim 1, wherein the control unit is adapted to use a transfer function describing a relation between the turbulent flow condition measured by the plurality of unsteady pressure sensors at the serrated edge and an acoustic field created at the serrated edge for determination of the anti-noise signal.

6. The noise reduction means according to claim 5, wherein the transfer function is adapted to the serrated edge profile.

7. The noise reduction means according to claim 5, wherein the transfer function is empirically determined by at least one measurement and/or that the transfer function is stored in a data storage unit of the active noise reduction device.

8. A wind turbine blade comprising at least one noise reduction means according to claim 1.

9. A wind turbine comprising at least one wind turbine blade according to claim 8.

10. A method for noise reduction for a wind turbine blade using an active noise reduction device and a passive noise reduction device, wherein the passive noise reduction device comprises at least one serrated edge profile adapted for fixation to a trailing edge of the wind turbine blade, the at least one serrated edge profile having a plurality of teeth forming a serrated edge, wherein the active noise reduction device comprises a plurality of unsteady pressure sensors adapted to produce an output signal corresponding to a turbulent flow condition during operation of the wind turbine blade, at least one actuator and a control unit, wherein the plurality of unsteady pressure sensors are arranged adjacent to the serrated edge of the serrated edge profile and the control unit controls the actuator in dependence of the output signal of the plurality of unsteady pressure sensors to emit an anti-noise signal at least partly reducing a noise generated by the wind turbine blade, wherein the plurality of unsteady pressure sensors includes at least three sensors, wherein the at least three sensors are arranged in one or more rows along the serrated edge, wherein each respective row of the one or more rows is positioned at a respective constant distance from the serrated edge.

11. The method according to claim 10, wherein the control unit uses a transfer function describing a relation between the turbulent flow condition measured by the plurality of sensors at the serrated edge and an acoustic field created at the serrated edge for determination of the anti-noise signal.

12. The method according to claim 11, wherein the transfer function is adapted to the serrated edge profile.

13. The method according to claim 11, wherein the transfer function is determined by at least one measurement and/or is stored in a data storage unit of the active noise reduction device.

14. The method according to claim 11, wherein the transfer function is stored in a data storage unit of the active noise reduction device.

* * * * *